United States Patent [19]

Couvreur

[11] Patent Number: 5,366,262
[45] Date of Patent: Nov. 22, 1994

[54] QUICK CONNECT FLUID FITTING

[75] Inventor: Jean-Francois Couvreur, Warrenville, Ill.

[73] Assignee: Furnas Electric Co., Batavia, Ill.

[21] Appl. No.: 918,247

[22] Filed: Jul. 23, 1992

[51] Int. Cl.⁵ .............................................. F16L 19/08
[52] U.S. Cl. .................................... 285/340; 285/359; 285/361; 285/402
[58] Field of Search ................ 285/340, 361, 359, 396, 285/402, 330, 81

[56] References Cited

U.S. PATENT DOCUMENTS

| 2,495,373 | 1/1950 | Grunt ................................ 285/361 X |
| 3,140,107 | 7/1964 | Hynes ................................ 285/340 |
| 3,312,483 | 4/1967 | Leadbetter . |
| 3,312,484 | 4/1967 | Davenport . |
| 3,365,219 | 1/1968 | Nicolaus ............................ 285/340 |
| 3,429,596 | 2/1969 | Marshall . |
| 3,434,744 | 3/1969 | Yoke et al. ....................... 285/340 X |
| 3,879,065 | 4/1975 | Kobayashi ....................... 285/340 X |
| 4,062,574 | 12/1977 | Scholin . |
| 4,084,843 | 4/1978 | Gassert . |
| 4,593,943 | 6/1986 | Hama et al. ..................... 285/340 X |
| 4,890,865 | 1/1990 | Hosono et al. .................. 285/39 X |
| 4,895,395 | 1/1990 | Ceriani ............................. 285/39 |
| 4,919,457 | 4/1990 | Moretti ............................ 285/340 X |
| 4,964,657 | 10/1990 | Gonzales . |
| 5,039,141 | 4/1991 | Badoureaux . |
| 5,096,235 | 3/1992 | Oetiker ............................ 285/340 X |
| 5,160,179 | 11/1992 | Takagi .............................. 285/39 X |

FOREIGN PATENT DOCUMENTS

| 0272988 | 6/1988 | European Pat. Off. ............ 285/340 |
| 0234686 | 9/1989 | Japan ................................ 285/340 |
| 4131583 | 5/1992 | Japan ................................ 285/340 |
| 6700801 | 7/1967 | Netherlands ...................... 285/340 |
| 0916070 | 1/1963 | United Kingdom .............. 285/340 |
| 1555640 | 11/1979 | United Kingdom .............. 285/340 |
| 2047831 | 12/1980 | United Kingdom .............. 285/340 |

Primary Examiner—Randolph A. Reese
Assistant Examiner—Heather C. Shackelford
Attorney, Agent, or Firm—Wood, Phillips, VanSanten, Hoffman & Ertel

[57] ABSTRACT

A quick connect fitting for connecting a plastic or metallic tube (42) in a fluid circuit includes a fitting body (20) having an interior cavity (22) opening to the exterior of the body (20) via a generally circular port (36). A peripheral step (48) is located in the port (36) and an O-ring (50) is abutted against the step (48). A washer (52) is located in the port (36) and has a central opening (54) slightly larger than the outer dimension of the plastic or metallic tube (42). A peripheral flange (56) is disposed on the washer is directed away from the O-ring (50). A retaining ring (62) is disposed in the port (36) and nominally abuts the flange (56). The retaining ring (62) has a central opening (64) substantially greater than the outer dimension with a plurality of resilient, radially inwardly directed, angularly spaced fingers (66). The radially inner ends (70) of the fingers define a tube passage area (68) and are provided with cutting surfaces (72) for digging into the outer surface of the plastic or metallic tube (42). A lock member having a central opening (100) for receiving the plastic or metallic tube (42) is provided and is secured in the port (36) against the retaining ring (62) and abuts the fingers (66) so that they can only deflect into and out of the washer and not toward the member to provide positive retention of the tube (42).

9 Claims, 3 Drawing Sheets

QUICK CONNECT FLUID FITTING

FIELD OF THE INVENTION

This invention relates to couplings used in fluid circuits, and more specifically, to a fitting having a quick connect feature for incorporating a plastic or metallic tube into a fluid circuit.

BACKGROUND OF THE INVENTION

Quick connect fittings for use in fluid circuits have long been a staple in the fluid handling arts. In some cases, they are used for convenience to allow rapid connecting and disconnecting of fluid driven apparatus to a source of fluid under pressure, thereby facilitating interchangability. In other cases, they may be employed in the fabrication of basically permanent fluid connections simply to minimize the amount of labor required to make any given connection.

In all events, they represent a very important category of equipment which will remain in extensive use as long as there is a need to convey fluid from one location to another by a conduit.

In some of the more complicated examples of quick connect fittings, a male fitting is releasably joined with a female fitting. Both are in turn connected to some other sort of conduit. These types of connections are frequently used in pneumatic systems and while they serve their intended purpose well, it is still necessary to connect separate conduits to both the female and male halves of the overall coupling.

In some simpler types of couplings, a female coupling element may be connected into one part of the system in any conventional fashion. The female coupling element constitutes the entirety of the coupling as it is intended to receive the plain, cut end of a piece of hose or tubing. In other words, the male member of the coupling is provided by the hose or tube itself and not by a male half of a coupling.

This type of coupling, of course, advantageously does away with the need to connect a conduit to the male part of a coupling. Consequently, couplings of this sort are favored particularly where relatively permanent fluid circuits require couplings. That is to say, this type of coupling generally is readily suited to a quick connect between the elements that may not be as suited for quick disconnection with the consequence that the most extensive use of this type of coupling is in relatively permanent fluid circuits.

A large variety of proposals of such couplings have developed over the years and while many work well for their intended purpose, all too frequently they require specially formed parts that increase their cost. Furthermore, some require use of a tightening sleeve which actually tends to clamp components together. This is undesirable from the standpoint that it increases the labor content of the product.

The present invention is directed to overcoming one or more of the above problems.

SUMMARY OF THE INVENTION

It is the principal object of the invention to provide a new and improved quick connect fitting for connecting a plastic or metallic tube in a fluid circuit. More specifically, it is an object of the invention to provide such a fitting that is simple in construction and therefore economical to fabricate and which merely requires axial insertion of the plastic or metallic tube into the fitting to establish the connection and which is devoid of any clamping means requiring manual tightening or the like. Another object of the invention is to provide a quick connect fitting for connecting a plastic or metallic tube that can only be disconnected through the use of tools, thus preventing laypersons or children from disconnecting it.

An exemplary embodiment of the invention achieves the foregoing objects in a quick connect fitting construction including a fitting body having an interior cavity opening to the exterior of the body via a generally circular port. A peripheral step is disposed within the port and an O-ring is nominally abutted against the step. A washer is located in the port on the side of the O-ring remote from the step and has a central opening slightly larger than the outer dimension of the plastic or metallic tube with which the fitting is to be used. A peripheral flange is located on the washer and is directed away from the O-ring. A retaining ring is also disposed in the port. The retaining ring has a central opening of a size substantially greater than the outer dimension of the plastic or metallic tube with a plurality of resilient, radially inward directed, angularly spaced fingers. The radially inner ends of the fingers define a tube passage of a dimension somewhat less than the outer dimension of the plastic or metallic tube and are provided with cutting surfaces for digging into the outer surface of the plastic or metallic tube. A lock member having a central opening for receiving the plastic or metallic tube is secured in the port against the retaining ring.

One embodiment of the invention contemplates that means be provided for allowing the fingers to deflect from a first position to one side thereof toward the O-ring seal and for preventing the fingers from deflecting from the first position toward the opposite side thereof away from the O-ring seal. In the preferred embodiment, such means are provided by the lock member.

In a highly preferred embodiment, a bayonet slot connection is disposed between the member and the fitting body allow relatively easy removal of the member. In this embodiment, the port is provided with diametrically opposite L-shaped grooves within its interior and the member includes projections adapted to be received in the grooves.

A highly preferred embodiment of the invention contemplates the provision of a second step within the port. In this embodiment, the retaining ring is held against the second step by the lock member.

In one embodiment of the invention, the ends of each of the fingers have concave circular recesses. The radii of the recesses is less than twice the outer dimension of the plastic or metallic tube.

Preferably, the fingers are diametrically opposite and maximum spacing between corresponding parts of the recesses on diametrically opposite fingers is just less than the outer dimension of the plastic or metallic tube.

Other objects and advantages will become apparent from the following specification taken in connection with the accompanying drawings.

DESCRIPTION OF THE PREFERRED EMBODIMENT

Figure 1:
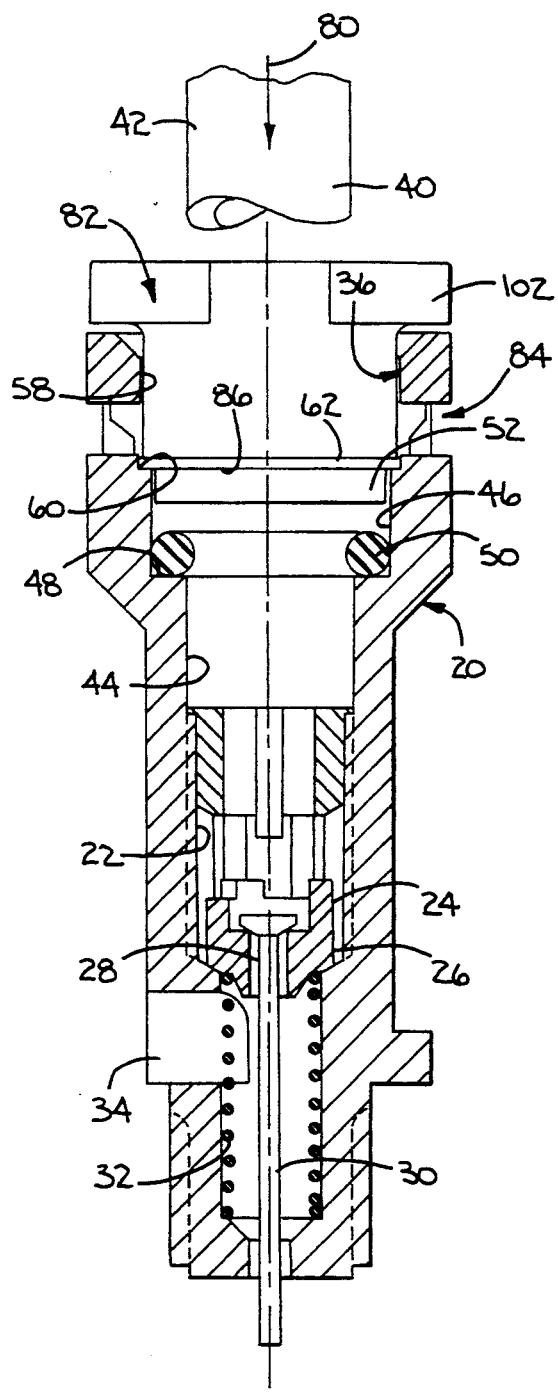
FIG. 1 is a sectional view of a fitting, specifically a valve, provided with a quick connect feature of the invention.

An exemplary embodiment of a fitting made according to the invention is illustrated in the drawings and with reference to FIG. 1 is seen to include a fitting body, generally designated 20. The body 20 is elongated and includes a central passage 22. Within the passage 22 is a poppet valve 24 which can seal against the seat 26. The poppet 24 includes a central opening 28 in which a pilot valve 30 is received. The central passage also receives a spring 32 which applies a biasing force to the poppet 24 toward a position away from the seat 26.

Below the poppet 24, the body 20 includes a fluid port 34. Above the poppet 24, the body includes a second fluid port, generally designated 36, which is equipped with the quick connect feature of the invention.

Returning momentarily to the valve components, the same form no part of the present invention. They are constructed and arranged for use as a pilot operated bleed valve intended to relieve high pressure in the compression chamber or chambers of an air compressor after the same has terminated a compression cycle. Further information with respect thereto may be had by reference to the commonly assigned, co-pending application of Walstad et al., Ser. No. 723,847, filed Jul. 1, 1991, and entitled "Unloading Valve For An Air Compressor System", the details of which are herein incorporated by reference.

The passage or port 36 within the fitting 20 is, of course, a cavity formed therein and includes three sections. All of the sections are intended to receive an end 40 of a piece of plastic or metallic tubing 42. A first of the sections is designated 44. The same is cylindrical and has a diameter that may be just slightly greater than the outer diameter of the tube 42.

Progressing away from the valve 24, a second section 46 is encountered. The section 46 is also cylindrical and has a diameter substantially larger than the outer diameter of the tube 42. It joins to the first section via a step 48. An O-ring seal 50 is disposed within the second section 46 in nominal abutment with the step 48. The O-ring seal 50 has an inner diameter slightly less than the outer diameter of the tube 42 and an outer diameter that will be slightly larger than the diameter of the second section 46.

As a consequence, when the tube 42 is fully inserted into the fitting 20, it will extend through the O-ring seal 50 into the first section 44. Its outer diameter will seal against the inner diameter of the O-ring seal 50 while the O-ring seal 50 will also seal against the fitting 20 to seal the connection between the tube 42 and the body 20.

Figure 3:
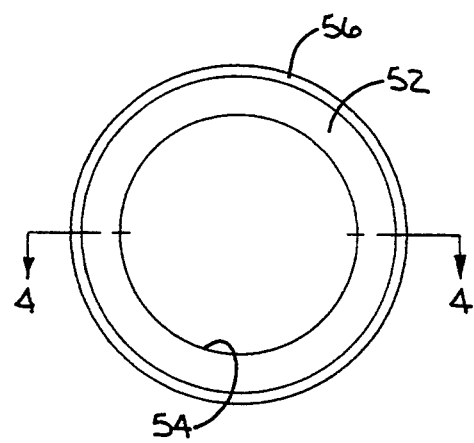
FIG. 3 is a plan view of a washer.

Also received within the second section 46 is a cup shaped washer 52. The washer 52 is typically formed of metal and includes, as best seen in FIG. 3, a central opening 54 that will be somewhat greater than the outer diameter of the tube 42. In one embodiment, where the tube 42 will have an outer diameter of 0.250", the diameter of the central opening 54 will be 0.259".

Figure 4:
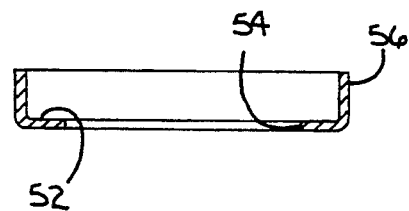
FIG. 4 is a sectional view taken approximately along the line 4—4 FIG. 3.

The washer 52 is surrounded by an integral, axially directed, peripheral flange 56 (FIG. 4). As received in the second section 46, the flange 56 extends in the direction away from the O-ring seal 50.

Figure 2:
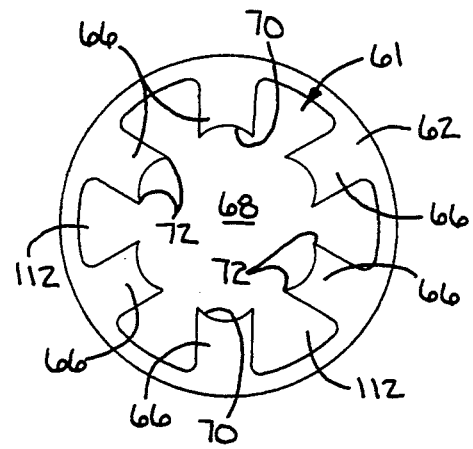
FIG. 2 is a plan view of a retaining ring used in the fittings.

The port 36 widens to a third section 58 which connects to the second section 46 via a step 60. Abutted against the step 60 and within the third section 58 is a retaining ring 62. The retaining ring 62 is illustrated in FIG. 2 and has a central opening, generally designated 64 which includes a plurality of radially inwardly directed fingers 66. The retaining ring 62 is typically formed of a metal so that the fingers 66 may resiliently deflect from a nominally planar position.

The area 68 between radially inner ends 70 of the fingers 66 is a tube receiving area through which the tube 42 may pass to extend further into the body 20. In a preferred embodiment, the ends 70 of the fingers 66 are concave as illustrated in FIG. 2. They are defined by circular arcs of a radius less than half the diameter of the tube 42 and as a consequence, each finger 70 present two rather sharp points 72 toward the opposite finger 66, which points are spaced from one another by a distance less than the outer diameter of the tube 42. Because the tube 42 is plastic or made of a relatively soft metal, it will be appreciated that the points 72 will tend to dig into the tubing 42.

In an embodiment wherein the outer diameter of the tube 42 is 0.250", the distance between diametrically opposite ones of the points 72 might be 0.205" and the radius of each arc defining a concave end 70 0.024". This in turn results in a maximum dimension across the area 68 of 0.236". This distance will be that at the deepest point of each of the concave ends 70 of diametrically ones of the fingers 66.

Thus, not only do the points 70 tend to cut into the wall of the tube 42 when it is inserted, the remainder of the edge of each of the concave ends 70 will also provide an extended cutting surface that will tend to dig into the tube.

When the retaining ring 62 is in place, and the tube 42 moves downwardly through the same in the direction of an arrow 80 (FIG. 1), the resiliency of the fingers 70 will allow the same to deflect so that the tube 42 may penetrate into the first section 44 of the port 36. The points 72 will engage the tube 42 and any attempt to pull the tube 42 out of the fitting 20 will, of course, cause the fingers 66 to dig more deeply into the tube 42 and present more resistance to its removal until such time as the fingers 66 go "over center" by moving from the O-ring side of the body of the retaining ring 62 to the opposite side thereof. However, to ensure retention, means are provided for preventing any such movement to the "over center" position. Such means are in the form of a lock member, generally designated 82, which is secured within the third section 58 by a bayonet slot connection, generally designated 84. The lower surface 86 of the lock member 82 abuts the fingers 66 on their side opposite the O-ring 50 to prevent such over center movement from occurring.

In addition, the lock member 82 holds the retaining ring 62 against the step 60, and in turn, serves to additionally retain the washer 52 and the O-ring 50 within the body in the positions described earlier. It will be observed that the principal function of the washer 52, the body of which is spaced somewhat below the fingers 66 by reason of the peripheral flange 56, is merely to allow the fingers 66 to flex toward the O-ring 50 during insertion of the tube 42 while preventing any contact between the O-ring seal 50 and the ends 70 and particularly the points 72 on the fingers 66 which could injure the surface of the o-ring seal 50 and prevent it from performing properly. It also prevents the O-ring from backing up under pressure against the fingers 66 of the retaining ring 62, which would cause the O-ring 50 to squirt between the fingers 66, eventually causing a leak.

Figure 5:
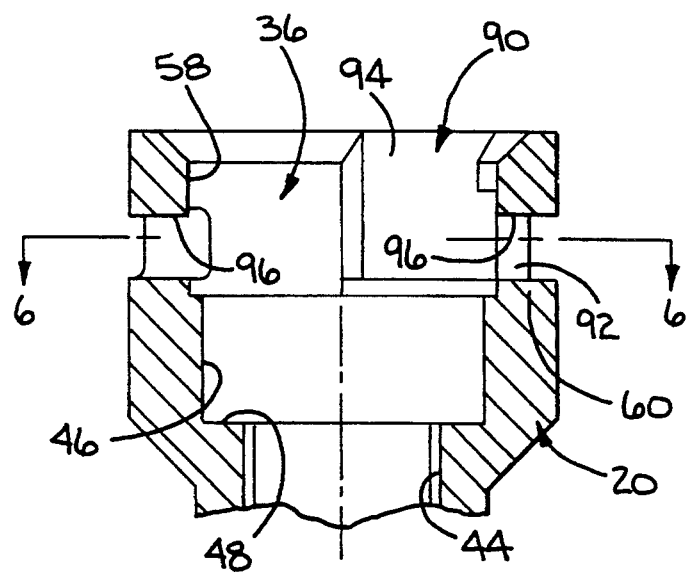
FIG. 5 is a fragmentary sectional view of the fitting body with a lock member removed.
Figure 6:
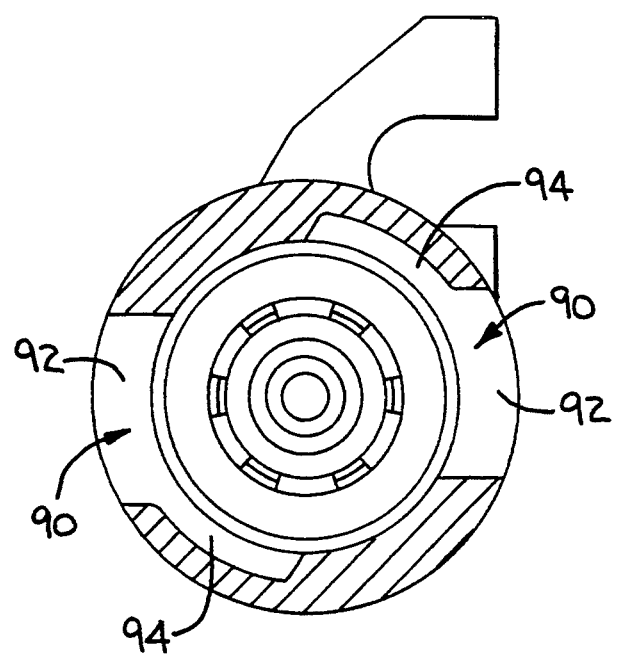
FIG. 6 is a sectional view taken approximately along the line 6—6 in FIG. 5.

Turning now to FIGS. 5 and 6, the third section 58 is seen to be provided with diametrically opposite L-shaped slots, generally designated 90. As can be readily seen in FIG. 5, each of the slots 90 includes a circumferential section 92 and an axial section 94. This in turn results in the formation of a retaining ledge 96 on the axial side of the circumferential section 92 remote from the step 60.

Figure 7:
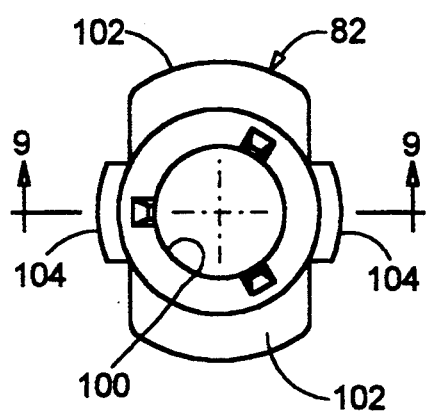
FIG. 7 is a plan view of a lock member.
Figure 8:
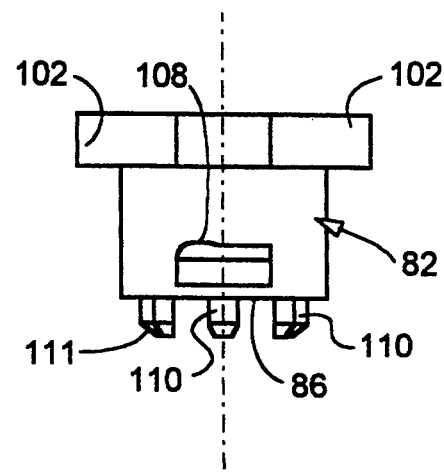
FIG. 8 is a side elevation of the lock member.
Figure 9:
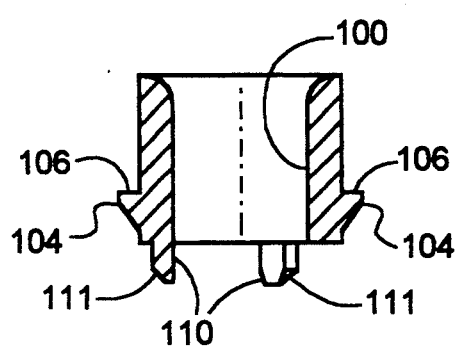
FIG. 9 is a sectional view taken approximately along the line 9—9 FIG. 7.
Figure 10:
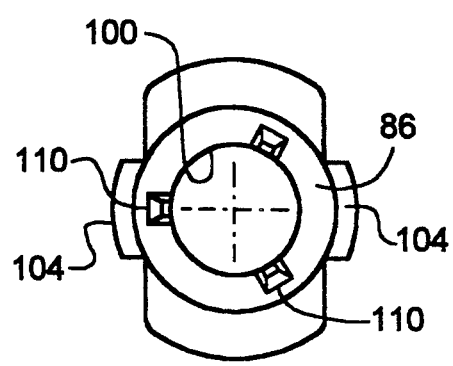
FIG. 10 is a bottom view of the look member.

Turning now to FIGS. 7-10, inclusive, the lock member 82 will be described in greater detail. As can be seen in FIGS. 7, 9 and 10, the same includes a central bore 100 which may be tapered so as to pilot the tube 42 into the fitting 20 when the tube 42 is moved in the direction of the arrow 80 (FIG. 1). The minimum dimension of the bore 100 will be slightly greater than the outer diameter of the tube 42.

One end of the lock member 82 includes oppositely extending tabs 102 which allow the lock member 82 to be grasped and rotated with an appropriate tool.

The opposite end of the lock member 82 terminates in the surface 86 which is received within the third section 58 of the port 36 as previously described. Thus, the tabs 102 will be exposed and out of the fitting 20 so that access thereto may be reasonably had.

Intermediate its ends, the lock member 82 includes diametrically opposite, radially outwardly directed projections 104. The projections 104 have the configuration illustrated in the drawings which include a relatively flat surface 106 which is adapted to underline a corresponding retaining ledge 96 in the fitting body 20 to secure the lock member 82 in place. The projections 104 are sized so as to be axially moveable within the axial sections 94 of the slots 90 and then rotated within the circumferential sections 92 until the surfaces 106 underlay the retaining ledges 96 for retention purposes. If desired, each of the surfaces 106 may be provided with a slight "bump" 108. A similar bump (not shown) may be associated with the retaining ledges 96 and the two may be configured so as to provide a slight interference fit to prevent inadvertant rotation of the lock member 82 once the same is in place.

It will thus be appreciated that the slots 90 and the projections 104 provide a readily releasable bayonet slot connection between the lock member 82 and the fitting body 20. Consequently, when it is desired to disconnect the tube 42 from the fitting 20, it is only necessary to loosen the lock member 82 by rotating the projections 104 into alignment with the axial sections 94 of the grooves 90 to allow the member 82 as well as the retaining ring 62 to be removed from the body 20 along with the tube 42.

In the preferred embodiment, the end 86 of the lock member 82 is provided with three equally angularly spaced prongs 110 having the configuration illustrated in FIGS. 8-10 which includes radially outer, diagonal centering surfaces 111. The prongs 110 may extend into spaces 112 (FIG. 2) between the fingers 66 of the retaining ring 62 to center the retaining ring 62 with respect to the bore 100, and provide an interference fit with the flange of the backup washer (FIG. 4).

From the foregoing, it will be readily appreciated that the invention provides a low cost, quick connect fitting for use in connecting a plastic or metallic hose into a fluid circuit. The fitting body itself may be made part of a fluid handling apparatus as, for example, a valve as illustrated in FIG. 1 and to achieve the connection it is only necessary to provide four additional components including a conventional O-ring 50, the washer 52 which may be readily formed by stamping to be provided with the peripheral flange 56, the retaining ring 62 which also may be stamped readily from sheet material and a lock member 82. Positive holding is assured by reason of the unique configuration of the retaining ring 62 while any danger of damage to the O-ring 60 by the retaining ring 62 is eliminated by the presence of the washer 52. Use of the lock member 82 to provide the dual function of retaining the components of the fitting in place as well as prevention of movement of the retaining ring fingers 66 to a releasing "over center" position minimizes the number of parts required. Furthermore, a rapid connection with a plastic or metallic hose such as the hose 42 may be readily achieved without the need for tightening or clamping down upon the components being utilized, thereby saving considerable labor in an assembly operation. At the same time, disassembly is facilitated because the lock member 82 need be rotated only a fraction of a turn between locking and unlocking positions.

I claim:

1. A quick connect fitting for connecting a plastic or metallic tube in a fluid circuit comprising:
   a fitting body having an interior cavity opening to the exterior of the body via a generally circular port;
   a peripheral step in said port;
   an O-ring in said port and nominally abutted against said step;
   a washer in said port on the side of said O-ring remote from said step and having a central opening slightly larger than the outer dimension of the plastic or metallic tube with which the fitting is to be used;
   a peripheral flange on said washer and directed away from said O-ring;
   a retaining ring in said port and nominally abutting said flange, said retaining ring having a central opening substantially greater than said outer dimension with a plurality of resilient, radially inward directed, angularly spaced fingers;
   the radially inner ends of said fingers defining a tube passage of a dimension somewhat less than said outer dimension and being provided with cutting surfaces for digging into the outer surface of said tube; and
   a lock member having a central opening for receiving said tube, said lock member being removably secured and rotatable in said port between a position lodged against said retaining ring and abutting said fingers so that said fingers can only deflect into and out of said washer and not toward said member, and a position removed from said port.

2. The quick connect fitting of claim 1 further including a bayonet slot connection between said member and said fitting body.

3. The quick connect fitting of claim 1 further including a second step within said port, said retaining ring being held against said second step by said lock member.

4. The quick connect fitting of claim 1 wherein each of said fingers have tips which have concave circular recesses and said outer dimension is an outer diameter, the radii of said recesses being less than half said outer diameter.

5. The quick connect fitting of claim 4 wherein said fingers are diametrically opposite from one another and maximum spacing between corresponding parts of the recesses of diametrically opposite fingers is just less than said outer dimension.

6. A quick connect fitting for connecting a tube of "X" outside diameter in a fluid circuit comprising:

a fitting body having a circular, tube receiving opening;

said opening, within said body having a first section with a diameter somewhat larger than "X", a second section having a diameter larger than said first section and joined thereto by a first step, and a third section having a diameter greater than that of said second section and joined thereto by a second step;

an O-ring seal having an inner diameter somewhat less than "X" and an outer diameter slightly larger than the diameter of said second section, said O-ring seal being located in said second section and against said first step;

a resilient retaining ring in said third section and abutted against said second step, said retaining ring having a central opening provided with a plurality of radially inward directed fingers which in turn define a tube receiving area having a diameter less than "X", said fingers including biting surfaces for biting into the exterior of a tube in said receiving area;

means in said third section for allowing said fingers to deflect from a first position to one side toward said O-ring seal and preventing said fingers from deflecting from said first position toward the opposite side away from said O-ring seal; and means for holding said retaining ring in said third section against said second step.

7. The quick connect fitting of claim 6 including a lock member secured in said third section, said lock member abutting said retaining ring to constitute both said allowing and preventing means and said holding means.

8. The quick connect fitting of claim 7 wherein said third section includes a cylindrical wall having diametrically opposite L-shaped grooves extending to the exterior of said body, and said lock member has diametrically opposite projections sized to be received in said grooves, said grooves and said projections defining a bayonet slot connection between said lock member and said filtering body.

9. The quick connect fitting of claim 6 further including a cup shaped washer in said second section and interposed between said retaining ring and said O-ring seal to prevent contact therebetween.

* * * * *